(12) United States Patent
Liu et al.

(10) Patent No.: US 8,031,948 B2
(45) Date of Patent: Oct. 4, 2011

(54) SHAPE COMPARISON APPARATUS ON CONTOUR DECOMPOSITION AND CORRESPONDENCE

(75) Inventors: Rujie Liu, Beijing (CN); Takayuki Baba, Kawasaki (JP); Susumu Endo, Kawasaki (JP); Shuchi Shiitani, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1201 days.

(21) Appl. No.: 11/784,734

(22) Filed: Apr. 9, 2007

(65) Prior Publication Data

US 2007/0286493 A1 Dec. 13, 2007

(30) Foreign Application Priority Data

Apr. 12, 2006 (CN) .......................... 2006 1 0072131

(51) Int. Cl.
*G06K 9/46* (2006.01)

(52) U.S. Cl. ..................................... 382/203; 382/218

(58) Field of Classification Search .................. 382/141
See application file for complete search history.

(56) References Cited

U.S. PATENT DOCUMENTS

| 4,783,829 A | 11/1988 | Miyakawa et al. |
| 6,044,171 A | 3/2000 | Polyakov et al. |
| 6,801,661 B1 | 10/2004 | Sotak et al. |

OTHER PUBLICATIONS

Kauppinen et al.; "An Experimental Comparison of Autoregressive and Fourier-based Descriptors in 2D Shape Classification;" IEEE Trans. on Pattern Analysis and Machine Intelligence, vol. 17, No. 2; pp. 201-207; Feb. 1995.
Farzin Mokhtarian; "Silhouette-Based Isolated Object Recognition through Curvature Scale Space;" IEEE Trans. on Pattern Analysis and Machine Intelligence, vol. 17, No. 5; pp. 539-544; May 1995.
Milios et al.; "Shape Retrieval Based on Dynamic Programming;" IEEE Trans. on Image Processing, vol. 9, No. 1; pp. 141-147; Jan. 2000.
Kim et al.; "Shape Analysis and Classification: 2D Shape Representation; 5.2.2 A Counter Following Algorithm;" pp. 341-347; 1988.
Urs Ramer; "Shape Analysis and Classification: 5.4.2 Ramer Algorithm for Polygonal Approximation;" pp. 354-365; 1972.
Veltkamp et al; "State of the Art in Shape Matching;" pp. 87-119, 2001.
Graham's Algorithm; Convex Hulls in Two Dimensions; pp. 72-87, 1998.
Bunke et al.; "Applications of Approximate String Matching to 2D Shape Recognition;" Pattern Recognition, vol. 26, No. 12, pp. 1797-1812; Jul. 1993.

*Primary Examiner* — Daniel Mariam
*Assistant Examiner* — Elisa Rice
(74) *Attorney, Agent, or Firm* — Greer, Burns & Crain, Ltd.

(57) ABSTRACT

The present invention discloses a shape comparison apparatus and method based on contour decomposition and correspondence. The apparatus comprises a polygonal approximation unit for approximating an image object contour as a polygon, namely representing the image object contour into an ordered contour primitive sequence; an attribute generation unit for calculating attribute value for contour primitive and contour primitive composition; and a comparison unit for establishing correspondence of polygons and hence calculating similarity between contours. Preferably, the apparatus further comprises an image object contour extraction unit for extracting, in the case the input into the apparatus is an image object rather than an image object contour, an image object contour of an image object inputted into the apparatus.

30 Claims, 5 Drawing Sheets

| | b1 | b2 | b3 | b4 | b5 | b6 | b7 | b8 | b9 | b10 | b1 | b2 | b3 | b4 | b5 | b6 | b7 | b8 | b9 | b10 |
|---|---|---|---|---|---|---|---|---|---|---|---|---|---|---|---|---|---|---|---|---|
| | D(0,0) 0 | D(0,1) 0 | D(0,2) 0 | D(0,3) 0 | D(0,4) 0 | D(0,5) 0 | D(0,6) 0 | D(0,7) 0 | D(0,8) 0 | D(0,9) 0 | D(0,10) 0 | D(0,11) 0.46 | D(0,12) 0.93 | D(0,13) 1.37 | D(0,14) 1.76 | D(0,15) 2.12 | D(0,16) 2.48 | D(0,17) 2.86 | D(0,18) 3.25 | D(0,19) 3.64 | D(0,20) 4.06 |
| a1 | D(1,0) 0.47 | 0.5 | 0.03 | 0.02 | 0.38 | 0.22 | 0.19 | 0.41 | 0.04 | 0.04 | 0.02 | 0.5 | 0.47 | 0.67 | 1.03 | 1.75 | 2.18 | 2.55 | 2.88 | 2.97 | 3.24 |
| a2 | D(2,0) 0.97 | 0.51 | 0.32 | 0.17 | 0.61 | 0.49 | 0.39 | 0.67 | 0.54 | 0.21 | 0.22 | 0.05 | 0.32 | 0.52 | 0.97 | 1.13 | 1.36 | 1.75 | 2.73 | 2.79 | 2.94 |
| a3 | D(3,0) 1.44 | 0.5 | 0.54 | 0.37 | 0.58 | 0.57 | 0.69 | 0.8 | 0.72 | 0.6 | 0.25 | 0.38 | 0.08 | 0.25 | 0.66 | 1.13 | 1.34 | 1.50 | 1.75 | 1.85 | 2.16 |
| a4 | D(4,0) 1.87 | 1.06 | 0.71 | 0.59 | 0.72 | 0.7 | 1.09 | 1.05 | 0.86 | 0.77 | 0.53 | 0.36 | 0.34 | 0.3 | 0.59 | 0.94 | 1.07 | 1.43 | 1.75 | 1.76 | 1.91 |
| a5 | D(5,0) 2.26 | 1.45 | 1.1 | 0.98 | 0.62 | 0.92 | 1.02 | 0.79 | 1.12 | 0.95 | 0.92 | 0.73 | 0.54 | 0.52 | 0.16 | 0.78 | 1.2 | 1.16 | 1.65 | 1.92 | 2.09 |
| a6 | D(6,0) 2.55 | 1.74 | 1.39 | 1.17 | 0.92 | 0.75 | 0.88 | 1.28 | 0.89 | 1.15 | 1.11 | 0.75 | 0.76 | 0.8 | 0.46 | 0.79 | 0.74 | 1.28 | 1.5 | 1.52 | 1.93 |
| a7 | D(7,0) 2.84 | 1.99 | 1.62 | 1.25 | 1.17 | 1.06 | 0.93 | 1.27 | 0.96 | 0.95 | 1.32 | 1.04 | 0.92 | 0.85 | 0.71 | 0.29 | 0.42 | 1.03 | 1.26 | 1.32 | 1.58 |
| a8 | D(8,0) 3.16 | 2.31 | 1.93 | 1.56 | 1.49 | 1.48 | 1.32 | 0.98 | 1.19 | 1.08 | 1.1 | 1.06 | 1.22 | 0.93 | 1.03 | 0.32 | 0.55 | 0.62 | 1.33 | 1.4 | 1.47 |
| a9 | D(9,0) 3.57 | 2.73 | 2.34 | 1.98 | 1.54 | 1.06 | 1.6 | 1.27 | 1.22 | 1.49 | 1.37 | 1.19 | 1.54 | 1.35 | 1.04 | 0.6 | 0.76 | 0.81 | 1.14 | 1.38 | 1.7 |
| a10 | D(10,0) 4.06 | 3.22 | 2.82 | 2.41 | 2.12 | 1.82 | 1.6 | 1.36 | 0.95 | 1.05 | 1.22 | 1.49 | 1.7 | 1.57 | 1.53 | 1.02 | 1.14 | 0.9 | 0.49 | 0.59 | 0.76 |

SHAPE COMPARISON APPARATUS ON CONTOUR DECOMPOSITION AND CORRESPONDENCE

FIELD OF THE INVENTION

The present invention relates to a shape comparison apparatus and a shape comparison method, and more particularly to a shape recognition and comparison apparatus and method based on contour decomposition and correspondence.

DISCUSSION OF THE RELATED ART

Image recognition and content-based retrieval have become a major research area in recent years due to the ever increasing importance of image application in many such application fields as entertainment, business, arts and engineering and science, and due to the ever increasing numbers of images. A fundamental problem in image recognition and retrieval is the technique used for comparing images. There are currently three general features used in image recognition and retrieval, namely shape, color and texture. A recent user survey about cognition aspects of image retrieval shows that users are more interested in retrieval by shape than by color and texture. Although object shape information can provide a very powerful support for visual image retrieval and recognition, the ease with which humans capture the image content and make retrieval based on the content has not been understood at all. As a result, it has been so far infeasible to carry out automatic retrieval and recognition on the basis of human cognition method. Therefore, it is still a pending task to be solved as how to sufficiently and effectively describe the shape features of an image object.

Shape matching is a central problem in many video information processing systems, such as computer vision, pattern recognition and robotics. Applications of shape matching include industrial production inspection, fingerprint matching, image recognition and content-based image retrieval. To address the challenging issues involved in shape matching, many methods have been proposed by scholars.

As one of the existed shape feature, Fourier descriptors express, according to frequency domain feature, shape contour, referring to H. Kauppinen, T. Seppanen, and M. Pietikainen, "An Experimental Comparison of Autoregressive and Fourier-based Descriptors in 2-D Shape Classification," IEEE Transaction on Pattern Analysis and Machine Intelligence, vol. 17, pp. 201-207, 1995. This method makes Fourier transform on the contour of the image object, and describes the image object with transform factors. However, the Fourier descriptor itself is not affine invariant. The common solution to achieve rotation and starting point invariance is to throw away the phase information of the result. Scale invariance is then achieved by normalizing the magnitudes of the transform factors. The Euclidean distance metric is used to measure the similarity.

As another shape feature, Farzin Mokhlarian (refer to F. Mokhlarian, "Silhouette-Based Isolated Object Recognition through Curvature Scale Space," IEEE Transaction on Pattern Analysis and Machine Intelligence, vol. 17, pp. 539-544, 1995) proposes a curvature scale space (CSS) method to extract shape features. This method calculates the curvature of contour lines under different scales, and constructs shape features in accordance with the curvature information, thus achieving affine invariance and better antinoise properties. However, this method merely takes the contour of an image as the object to be processed but fails to take into consideration the content included in the contour. As a result, the features obtained are not all-sided, and it is usually difficult to get a satisfactory effect to match the image by the use of these features.

In U.S. Pat. No. 6,801,661, a method for representing the content of an image in terms of the shape attributes of identified interested segments is presented. This method analyzes each segment in the image to automatically identify one or more perceptually significant components, and then represents each component in terms of Fourier descriptors. By repeating this process, the image is converted into a composition of its characterized segments. This technique can then be used to achieve and retrieve images based on the shape features of these segments.

To solve the problem of pattern matching with an attitude rotation, vertex region based matching method is presented in U.S. Pat. No. 4,783,829. Firstly, internal and external outlines of the object pattern are polygonal approximated, and characteristic polygon vertexes therein are determined to represent the attitude rotation of the pattern. In matching, common region of two polygons is obtained by means of the polygon vertexes instead of by means of pixels, and the similarity of the two shape is obtained.

In U.S. Pat. No. 6,044,171, a multiple scale space based method is presented to describe the shape of an object. To recognize a contour curve, an iterative parameterization and transformation procedure is used to develop a mutually independent Fourier descriptor set, and the contour of the target object is described according to this descriptor set space. It was said that the Fourier descriptor set based method has properties that enable effective recognition and compression.

Global attributes based methods as discussed above are often limited in modeling perceptual aspects of shapes. Recently, more and more attention has been paid to local attributes based methods, such as edges and corners. The basic idea of these methods is to extract salient visual parts from the target objects, and then build the correspondence between the important parts of two target objects and calculate similarities on the basis thereof.

Referring E. Milios, E. Petrakis, "Shape Retrieval Based on Dynamic Programming," IEEE Transaction on Pattern Analysis and Machine Intelligence, vol. 9, pp. 141-147, 2000, Milios and Petrakis segment inputted contour shapes into ordered convex/concave curve segments, and calculate similarity of contours by building correspondence of the convex/concave curve segments. Merge operation of adjoining segments plays an important role in matching process, however, this operation is limited by predefined rules. Besides this, the geometric features of curve segments are not effective enough.

SUMMARY OF THE INVENTION

The present invention provides a shape comparison apparatus capable of calculating the similarity of two target objects based on their contour information. With this apparatus, the recognition and retrieval of images based on shape features is enabled.

To achieve the object of this invention, the shape comparison apparatus according to this invention accepts image objects or their contours as input. With the image objects as the input, the apparatus firstly extract the contours of the inputted image objects. Thus, the input is normalized into ordered coordinate sequences of the boundary pixels. According to the present invention, the contour is firstly approximated as a polygon, and attribute value is then assigned to each polygon vertex, so that the polygon is converted into an attributed string. During matching, a string matching technique is used to build correspondence between polygons, and similarities between the polygons are then calculated on the basis thereof.

According to the present invention, the shape comparison apparatus comprises a polygonal approximation unit for approximating an image object contour as a polygon, namely representing the image object contour into an ordered contour primitive sequence; an attribute generation unit for calculating attribute value for contour primitive and contour primitive combination; and a comparison unit for establishing correspondence of polygons and hence calculating similarities between contours.

According to the present invention, a shape comparison method comprises a polygonal approximation step for approximating an image object contour as a polygon, namely representing the image object contour into an ordered contour primitive sequence; an attribute generation step for calculating attribute value for contour primitive and contour primitive combination; and a comparison step for establishing correspondence of polygons and hence calculating similarities between contours.

The polygonal approximation unit converts the contour of an inputted image object into a polygon. Some preexistent and optimized polygonal approximation methods can be applied in this unit. However, most of them are time consuming and segmentation inconsistencies still exist due to noise and image distortions. A split-and-merge method is used in the present invention to carry out polygonal approximation on image contours due to its simplicity and fast speed. To improve the robustness of this method, higher curvature points in the contour are used as initial positions of the split-and-merge procedure.

After polygonal approximation, contours are simplified into polygons, which can be totally represented by ordered vertices. Each vertex in a polygon corresponds to two intersecting line segments. One vertex and two sides corresponding thereto are defined in the present invention as a contour primitive. In this manner, both the contour primitive and the combination of several adjoining contour primitives are actually polylines. The task of the attribute generation unit is to define attribute values for each contour primitives and the combination of several adjoining contour primitives; in other words, to describe the polylines with their geometric features. Two attributes are used in the present invention, namely turning function and convexity/concavity degree of the polyline. Both of these two features are perceptually meaningful and can be quickly extracted from the polylines.

After polygonal approximation and attribute generation, the contour of an inputted image object is reasonably converted into an attributed string, with each character corresponding to a primitive. In the matching unit, an attributed string matching technique (namely dynamic programming [DP] matching technical) is used to build the correspondence of the polylines (namely the primitives or combination of primitives), and the similarities between the contours are calculated. To solve the problem of segmentation inconsistence generated in the polygonal approximation unit, a merge operation is employed in the comparison unit; that is to say, it is allowed for a contour primitive to correspond to a plurality of primitives or for a plurality of primitives to correspond to another plurality of primitives. In conventional methods, distances between merged strings are usually approximately calculated by introducing a merge cost value based on experience, and it is hence difficult to keep the consistence of the distance calculation. Whereas in the present invention, the attribute values of the polylines (contour primitives or combination of contour primitives) are calculated in real time, and consistence of the distance measurement is therefore achieved. Another problem with the representation of 2D shape contours by the attributed string is how to determine the starting position of the attributed string. This problem is solved in the present invention through an annular string matching technique.

DETAILED DESCRIPTION OF THE PREFERRED EMBODIMENTS

Preferred embodiments of the present invention are explained below with reference to the accompanying drawings.

Figure 1:
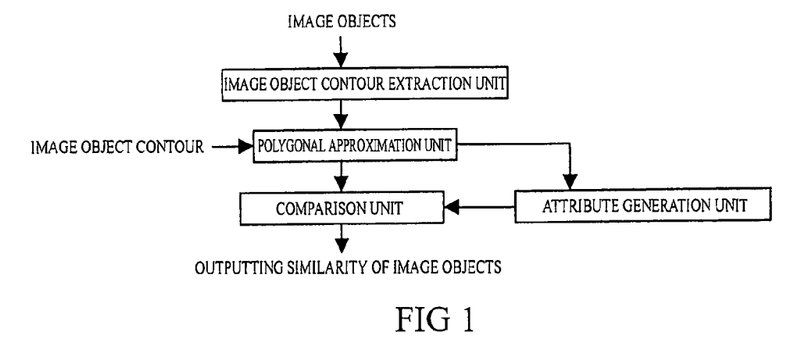
FIG. 1 is a structural sketch of the shape comparison apparatus based on contour decomposition and correspondence.

FIG. 1 is a structural sketch of the shape comparison apparatus based on contour decomposition and correspondence according to the present invention. The input of this apparatus is the image objects or the contours of the image objects, and the output thereof is their similarities. To achieve this function, the apparatus comprises the following three units (1) a polygonal approximation unit that approximates an inputted contour as a polygon; (2) an attribute generation unit that calculates attribute value for contour primitive and contour primitive composition; and (3) a comparison unit that is in charge of establishing correspondence of polygons and hence calculating similarities between contours.

According to the present invention, the input of the apparatus can only be the image objects or the contours of the image objects. The contour of an image object here stands for the coordinate value sequence of the contour pixels of a certain object, and the coordinate value sequence is ordered, namely an ordered coordinate value sequence of the contour pixels. Furthermore, the shape comparison apparatus according to the present invention further comprises an image object contour extraction unit. In the case the input is an image object, the contour of this image object should be firstly extracted; that is to say, the ordered coordinate value sequence of the contour pixels of this object is extracted. Some prior art methods can be used to extract the contours of image objects, refer to Luciano da Fontoura Costa and Roberto Marcondes Cesar Jr., Shape Analysis and Classification: Theory and Practice, CRC Press LLC, page 341-347

1. Polygonal Approximation Unit

The task of this unit is to approximately represent the contours of image objects with polygons; that is to say, to represent the contours of image objects as ordered contour primitive sequences. Some prior art polygonal approximation methods can be used to achieve this function. The present invention employs the split-and-merge method to perform polygonal approximation due to its simplicity and fast speed. Refer to L. F. Costa, R. M. Cesar, "Shape Analysis and Classification: Theory and Practice", CRC Press, pp. 354-365.

The split-and-merge method achieves polygonal approximation of contours through an iterative procedure. Firstly, two initial points are selected from the contour to split the whole contour into two curve segments, and these curve segments are then repeatedly split into smaller curve segments until the distance from the pixel points on the curve segments to the subtense corresponding to the curves falls within a predetermined threshold value. In other words, these curve segments are approximated by lines within an acceptable error range. After the splitting process, the merge operation is performed to resolve segmentation errors, especially by removing redundant vertices.

However, as the approximation results obtained via this method are closely related to the initial points, it is necessary to be cautious in selecting the initial points so as to reduce the inconsistence of the decomposition results as far as possible. In the present invention, points having higher curvature values on the contour curve are taken as the initial points (also referred to as initial positions) of the split-and-merge method; for instance, select top N points having curvature values arranged in a decreasing order (namely most previous N points having maximum curvature values), or select all of the points whose curvature values are larger than a certain threshold value.

Figure 2:
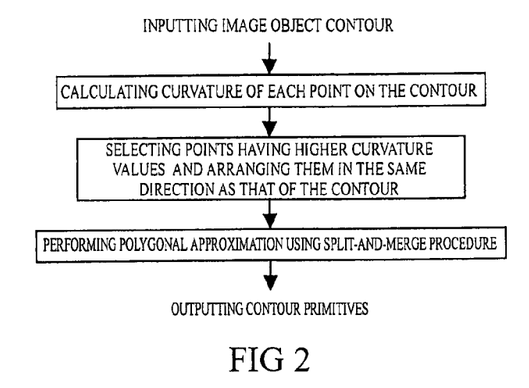
FIG. 2 is a flowchart of the polygonal approximation unit.

Simply put, the polygonal approximation unit comprises two steps: (1) calculate the curvature value of each pixel on the contour; and (2) with points having higher curvature values as input, carry out the split-and-merge procedure to approximate the contour as a polygon. FIG. 2 shows the operational flow of this unit.

1.1. Curvature Calculation

Many methods can be used to calculate the curvature value of a certain point on the curve. An intuitionistic method is adopted to directly calculate the curvature value in one embodiment according to the present invention. Assume $P_i = \{(x_i, y_i), i=1, \ldots, N\}$ be the coordinate sequence of an image object contour, the curvature value of a point $p_i$ on the contour can be calculated based on its neighboring contour points, as follows:

1. Tangent Direction Calculation

Let $$dy_i = \sum_{m=1}^{M}(y_{i+m} - y_{i-m}), \quad dx_i = \sum_{m=1}^{M}(x_{i+m} - x_{i-m}),$$

the tangent direction of the point $p_i$ is:

$\theta_i = \arctan(dy_i / dx_i)$

2. Curvature Calculation

Let $$d\theta_i = \sum_{m=1}^{M}(\theta_{i+m} - \theta_{i-m}), \quad dl_i = \sum_{m=-M}^{M}((y_{i+m} - y_i)^2 + (x_{i+m} - x_i))^2,$$

the curvature value of the point $p_i$ is: $c_i = d\theta_i / dl_i$

In the present invention, the value of the parameter M in the above calculation can be set as 7.

Figure 3A:
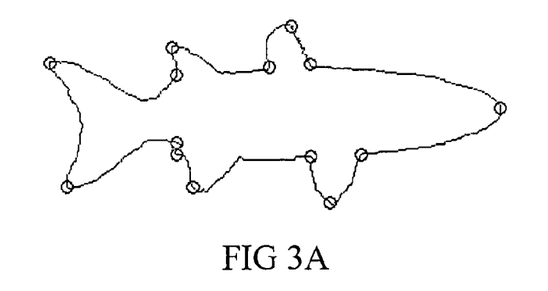
FIG. 3A shows an example of detected results of high curvature points.

Points having higher curvature values are then selected, and their coordinates are used as input for the split-and-merge procedure. Simple rules can be used to select the points having higher curvature values. In the present invention, all points having curvature values larger than the threshold of 0.08 are used as the initial points. FIG. 3A provides the detected results of the points having high curvature values, which are marked by circles.

The points having high curvature values obtained above should be sequenced in an orderly form and in the same direction as the pixel points of the contour. In other words, these points should be ordered in clockwise direction if the pixel points of the image objects contour are in clockwise direction, and vice versa.

1. 2. Split-and-Merge

The split operation is an iterative procedure. It starts from an initial position and repeatedly checks whether the distance from the pixel points on the curve segment to the subtense corresponding to the curve is larger than a predetermined threshold value: if so, the curve segment is split into two smaller curve segments at the furthest distance.

Let $p_i, i=1, \ldots, M$ be the ordered points having high curvature values obtained above.

According to one embodiment of the present invention, two stacks are adopted to complete the split operation, as follows:

```
push( closed, p₁ )
For i= M to 2
    push( open, pᵢ)
End
While ( NOT( empty(open) ) )
    A = stacktop ( closed )
    B = pop ( open )
    Find C|d(p, AB) ≦ d(C, AB), ∀p ∈ AB̂, P ≠ C
    If   d(C, AB) < ε
        then
            push ( closed , B )
        else
            push ( open , B )
            push ( open , C )
End
```

That is, two stacks, closed and open, are used to firstly perform initialization by pushing the first point having high curvature value into the stack closed, and pushing the following M−1 ordered points having high curvature values into the stack open. And then the following operation is performed cyclically:

Let A, B be respectively the topmost points having high curvature values of the stacks closed and open, B is popped out of the stack open, and the point (this point and the corresponding furthest distance being respectively indicated as C and $d(C, \overline{AB})$) having the furthest perpendicular distance from the arc $A\hat{B}$ to the subtense $\overline{AB}$ is searched. If the value of $d(C, \overline{AB})$ is less than the predetermined threshold value $\epsilon$, B is pushed into the stack closed; otherwise both B and C are pushed into the stack open.

This process is repeated until the stack open is empty.

In the above operation, $\widehat{AB}$ denotes the contour curve segment between points A and B along the contour direction, $\overline{AB}$ denotes line segments between points A and B, that is the subtense corresponding to $\widehat{AB}$, $d(C,\overline{AB})$ denotes the perpendicular distance from point C to $\overline{AB}$, and $\epsilon$ denotes the threshold value.

Next, merge operation is performed to correct errors generated in the split procedure. This operation checks two adjoining line segments and determines whether they can be approximately merged into one line segment. Let $\widehat{AB}$ and $\widehat{BC}$ be two adjoining curve segments, the operation firstly searches for the furthest distance from the points on the arc $\widehat{AC}$ to the subtense $\overline{AC}$: if this distance is larger than the threshold value $\epsilon$, no merge operation is made; otherwise the two curve segments are merged, and the arc $\widehat{AC}$ is approximated by the subtense $\overline{AC}$; in other words, the vertex is deleted.

Split-and-merge is an iterative procedure of the split and merge operations, where the vertices retained from the merge operation are used as initial points of the split operation to be inputted into the split operation, and the vertices obtained in the split operation are inputted into the merge operation for checking. This iteration is repeated until no modification of vertices happens.

The specific process of split-and-merge module is as follows:

```
For i=M to 1
    push( open,p_i )
End
While modified( open )
    push( closed, pop(open) )
    Split( open )
    Merge( closed )
    Move( open, closed )
End
```

That is, two stacks, closed and open, are used firstly to perform initialization by sequentially pushing the points having high curvature values into the stack open. And then the iterative split-and-merge procedure is performed:

Split operation: in accordance with the requirement of initialization of the aforementioned split operation procedure, the first vertex is popped out of the stack open and pushed into the stack closed, and this is taken as the initial position to cyclically perform the split operation.

Merge operation: after completion of the split operation, the stack open is empty, and all vertices are stored in the stack closed. Therefore, the points in the stack closed are merged. Thereafter, a group of new vertices obtained are moved into the stack open.

This process repeats itself until no more modification happens in the content of the stack open.

Figure 3B:
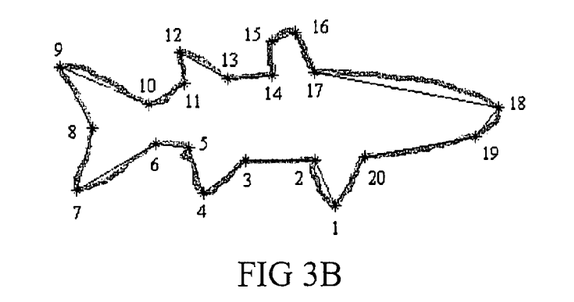
FIG. 3B shows an example of a polygonal approximation result.

After iteration, the finally obtained vertices are stored in the stack open. FIG. 3B shows an example of the polygonal approximation.

Figure 3C:
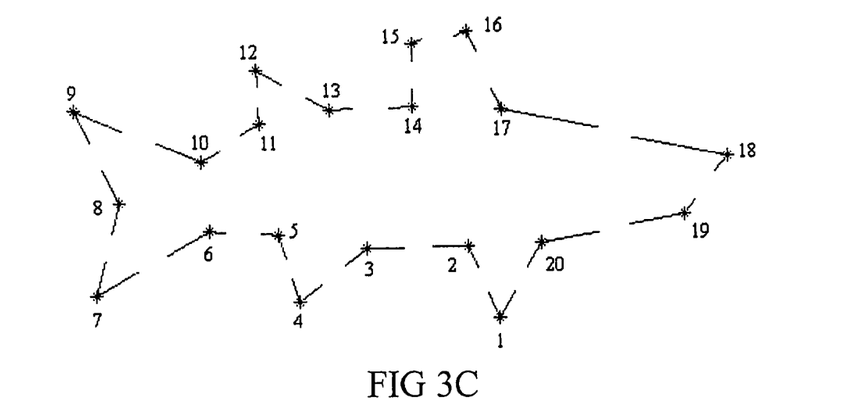
FIG. 3C shows all contour primitives constituting the polygon denoted in FIG. 3B.

In polygonal representation, each vertex of the polygon corresponds to two intersecting sides of the polygon. In the present invention, one vertex and the corresponding two sides are defined as a contour primitive. In this manner, both the contour primitive and the combination of several adjoining contour primitives are actually polylines. FIG. 3C shows all contour primitives constituting the polygon in FIG. 3B.

The split-and-merge module stores the following information of the contour primitive as its output results:

(1) Coordinate value of each vertex;
(2) Directions of two sides of the polygon in the contour primitive;

Assume $p_{i-1}p_ip_{i+1}$ be three adjacent vertices of the polygon, the direction of former side of $p_i$ is defined as directed from $p_{i-1}$ to $p_i$, while the direction of later side of $p_i$ is defined as directed from $p_i$ to $p_{i+1}$.

(3) Normalized lengths of the two sides of the polygon in the contour primitive.

The lengths of the two sides in the contour primitive are defined as the half distances from the current vertex to a former vertex and a later vertex respectively. Moreover, these distances are normalized by the total length of the contour.

2. Attribute Generation Unit

After polygonal approximation, contours of the inputted image objects are represented by ordered primitive sequences, and both a single contour primitive and the combination of several adjoining primitives are actually polylines. The task of the attribute generation unit is to assign attribute values to these contour primitives, so as to convert them into attributed strings. In the present invention, two attributes are used, namely turning function and convexity/concavity degree. These two attributes can be used to describe any random polylines, and are hence applicable to both a single contour primitive and the combination of several primitives.

2.1. Turning Function

The turning function of a polyline takes the length of the side as an independent variable, and the inclination angle of each side of the polyline and the x-axis as a value domain. It keeps track of the turning of each side of the contour polygon, with its function value increasing when turns of the side are accordant with contour direction, for example when all in clockwise direction or in counterclockwise direction, and decreasing when turns are opposite to the contour direction. For a polyline, the turning function is a piecewise constant function, increasing or decreasing only at positions corresponding to the vertices of the polyline, and constant between two adjacent vertices.

As regards the turning function, refer to R. C. Veltkamp, M. Hagedoorn, "State-of-the-art in Shape Matching," in M. Lew (Ed.), Principles of Visual Information Retrieval, Springer, pp, 87-119, 2001.

As discussed above, both a contour primitive and the combination of several contour primitives are actually polylines, and they can therefore be described by the turning function. It is easy to generate the corresponding turning functions as the directions of the two sides of a contour primitive and their normalized lengths are recorded in the polygonal approximation unit.

Figure 4:
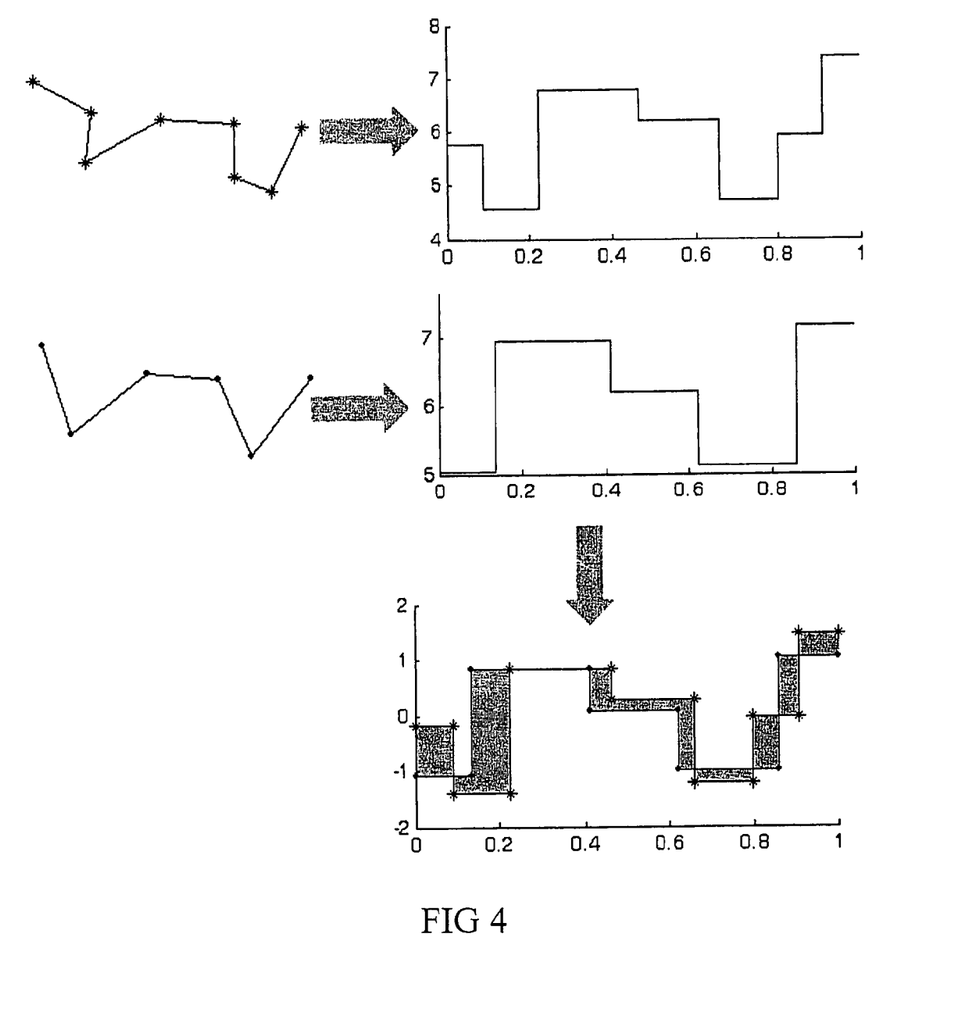
FIG. 4 shows the turning functions of two polylines and the distance between them.

The distance between two polylines can be calculated on the basis of the turning functions. Given two closed shape contours A and B, let $a_{i,j}$ and $b_{k,l}$ be merged contour primitives composed by contour primitives from $a_i$ to $a_j$ and $b_k$ to $b_l$ respectively, and let $\Theta_a(s)$ and $\Theta_b(s)$ be respectively the turning functions of these two merged contour primitives. The contour functions are firstly normalized into unit length, then, the distance between the two polylines based on the contour functions is given by:

$$\text{Dist}_t(a_{i,j},b_{k,l}) = (\int_0^1 (\Theta_a(s) - \Theta_b(s) + \theta)^2 ds)^{1/2}$$

where, $\theta$ is the rotation angle that minimizes the value of the above integral, which is shown as follows:

$$\theta = \int_0^1 \Theta_b(s)ds - \int_0^1 \Theta_a(s)ds$$

It is obvious that this distance measurement possesses rotation, scale and translation invariant, which are expected in shape comparison.

FIG. 4 shows the turning functions of two polylines and the corresponding distance calculation.

2.2. Convexity/Concavity Degree

Figure 5:
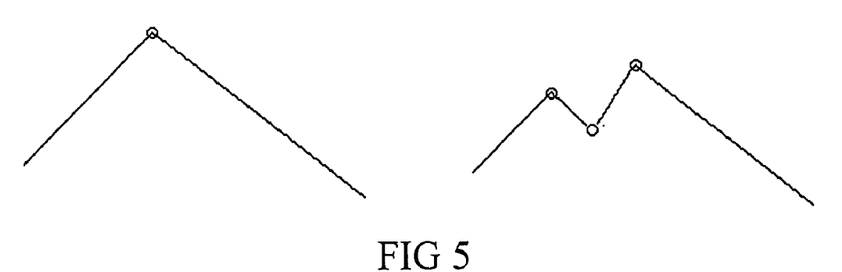
FIG. 5 shows an example to explaining one contour primitive being distorted into several contour primitives.

In the polygonal representation of an image object contour, each contour primitive may be identified as convex or concave type. Intuitionally, it seems more reasonable to build correspondence between the same convex (concave) type of the contour primitives. However, due to image noise and distortions, it is often necessary to build correspondences between one-to-many or many-to-many primitives, and these primitives may be of different types. For instance, as shown in FIG. 5, due to the influence of the distortions, one primitive in one image object contour corresponds to three primitives of different convexity/concavity types in another image object contour. In this case, the three primitives should be merged together and matched with the primitive in the first image contour.

However, not all merges and matchings are reasonable. In many situations, the merge will lead to erroneous results. In the present invention, convexity/concavity degree is used to measure the reasonability of the merging and matching operations. Measurement is under such ground that reasonable merging and matching operations are encouraged while unreasonable merging and matching operations are suppressed by a high punishment.

Let $a_{i,j}$ be merged primitives composed of contour primitives from $a_i$ to $a_j$, the convexity/concavity degree of $a_{i,j}$ is defined as follows:

(1) With points set $a_i, \ldots, a_j$ as input, calculate the convex hull.

Many prior art methods can be used to calculate the convex hull of the points set. And the present invention adopts Graham's algorithm. Refer to J. O'rourke, Computational Geometry in C, Cambridge University Press, pp. 72-87.

Figure 6:
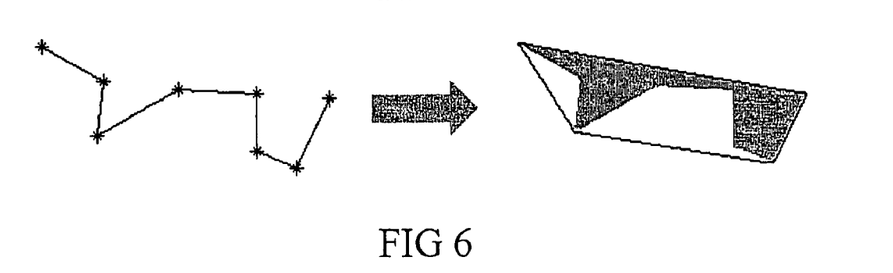
FIG. 6 explains the calculation of the convexity/concavity degree.

(2) Scan the inner region of the convex hull, and the areas inside and outside the closed contour in this region are separately calculated, denoted as InA and OutA. The convexity/concavity degree of this contour primitive is defined as:

$$c(a_{i,j}) = (InA - OutA)/(InA + OutA)$$

Obviously, the value range of the convexity/concavity degree is −1 to 1, with −1 and 1 respectively representing the concave primitive and the convex primitive. And the convexity/concavity degree attribute is invariant with rotation, translation and scale changes. FIG. 6 shows an example of the calculation process of this attribute.

The coordinates of each vertex of the polygon are recorded in the polygonal approximation unit. With these coordinate values, it is easy to calculate the convexity/concavity degree of the contour primitive through the aforesaid process.

Given two closed shape contours A and B, let $a_{i,j}$ and $b_{k,l}$ be merged contour primitives composed by contour primitives from $a_i$ to $a_j$ and $b_k$ to $b_l$ respectively. The distance between the two polylines according to the convexity/concavity degree attribute is as follows:

$$Dist_c(a_{i,j}, b_{k,l}) = |c(a_{i,j}) - c(b_{k,l})|$$

In the present invention, another simpler method for convexity/concavity calculation is provided, where the convex hull of the vertex of the polygon is not required to be calculated, thus greatly enhancing the calculation speed. The method is specified as follows:

As previously mentioned, a contour primitive is composed of one vertex of the polygon and two sides of the polygon, and the vertex is the point of intersection of these two sides. Therefore, this vertex and the other two end points of the two sides constitute a triangle. In this method, the area of the triangle corresponding to each contour primitive is pre-calculated, and negative values are taken for the area of concave primitives. Let $a_{i,j}$ be merged contour primitives composed of contour primitives from $a_i$ to $a_j$, and Area($a_t$) denote the area of the triangle corresponding to contour primitive $a_t$, the convexity/concavity degree of $a_{i,j}$ is thus defined as:

$$c(a_{i,j}) = \sum_{t=i}^{j} \text{Area}(a_t) \Big/ \left|\sum_{t=i}^{j} \text{Area}(a_t)\right|$$

3. Comparison Unit

In the present invention, the polygonal approximation unit converts the inputted image object contours into ordered contour primitive sequences, and the attribute generation unit defines attributes for the contour primitives (single primitive or combination of several primitives). In this manner, an inputted image object contour is converted into an attributed string. As a consequence, comparison of the similarities of the image object contours can be realized by establishing a correspondence of the contour primitives. The establishment of such a correspondence is in fact a problem of minimization, which can be realized through string matching technique or dynamic programming technique.

To calculate the distance of two strings of length n and m, the dynamic programming procedure uses an $(n+1) \times (m+1)$ dimension matrix D (DP table). Each cell $D(i,j)$ in this table corresponds to the distance between sub-strings composed of former i elements of the first string and sub-strings composed of former j elements of the second string. In standard DP technique, the value of $D(i,j)$ is calculated from the values of the adjoining previous three cells and the edit distance of these three cells to the current cell, that is:

Calculating the value of $D(i-1, j-1)$ and the sum of the distance from $D(i-1, j-1)$ to $D(i,j)$;

Calculating the value of $D(i, j-1)$ and the sum of the distance from $D(i, j-1)$ to $D(i, j)$;

Calculating the value of $D(i-1, j)$ and the sum of the distance from $D(i-1, j)$ to $D(i, j)$;

Finally, the minimum value of the aforementioned sums of three distances is taken as the value of $D(i,j)$.

Inconsistence may be always present in polygonal approximation due to noise and image distortions. For instance, one primitive in a first contour may be distorted to corresponding to several primitives in a second contour. Standard string matching method, or DP technique, that uses only three basic operations of substitution, insertion and deletion to match two strings would behave badly under such situations. In one embodiment of the present invention, merge operation is adopted to tackle this problem; in briefly, matching of many-to-many and one-to-many primitives is achieved as several primitives are allowed to be merged into one primitive during the matching to participate in the matching. Different from currently available methods, not simply by a merge cost value based on experience, instead, attributes value are calculated in real time for merged primitives in the matching procedure, thereby guaranteeing consistence in the matching calculation.

Another problem with the representation of 2D shape contours by attributed strings is the starting position of the string. Intuitionally, cyclic shift can be performed on a string, and the distance between the shifted string and another string is then calculated, and finally the minimum value in the distance is taken as the final result. However, this method is time consuming, with the calculation complexity degree being $O(mn^2)$. In the present invention, a cyclic string matching technique is employed to solve this problem, whereby the calculation complexity degree is reduced to $O(2mn)$. The basic reasoning of the cyclic string matching technique is to use the standard string matching technique to calculate the distance between the string A and the string $B^2$, so as to achieve cyclic matching of A and B. Here, $B^2$ denotes the string obtained by doubling B. Of course, the matching can also be implemented by doubling A. Through this method, the size of the DP table increases from the original (n+1)×(m+1) to the current (n+1)×(2m+1).

For more information on cyclic string matching, refer to: H. Bunke, U. Buhler, "Application of Approximating String Matching to 2D Shape Recognition," *Pattern Recognition*, vol. 26, pp. 1797-1812, 1993.

Assume $A=a_1, \ldots, a_n$ and $B=b_1, \ldots, b_m$ be two shapes to be matched, with $a_i$ and $b_k$ being the contour primitives of the two shapes. Let $a_{i,j}$ ($b_{k,l}$) be ordered primitives merge between the primitives $a_i$ and $a_j$ ($b_k$ and $b_l$), and $s_{i,j}$ ($s_{k,l}$) be the normalized length. In the present invention, the cost functions used in the string matching are defined as follows:

| | |
|---|---|
| Insertion operation | $c(\lambda \to a_{i,j}) = k * s_{i,j}$ |
| Deletion operation | $c(b_{k,l} \to \lambda) = k * s_{k,l}$ |
| Substitution operation | $c(a_{i,k} \to b_{k,l}) = \text{Dist}(a_{i,j}, b_{k,l}) * (s_{i,j} + s_{k,l}) * \max\left(\dfrac{s_{i,j}}{s_{k,l}} + \dfrac{s_{k,l}}{s_{i,j}}\right)$ | where k is a parameter to be determined.

According to the attributes of the contour primitives, the distance $\text{Dist}(a_{i,j}, b_{k,l})$ between $a_{i,j}$ and $b_{k,l}$ is calculated as follows:

$$\text{Dist}(a_{i,j}, b_{k,l}) = \text{Dist}_t(a_{i,j}, b_{k,l}) + \alpha \times \text{Dist}_c(a_{i,j}, b_{k,l})$$

where $\text{Dist}_t(\ )$ and $\text{Dist}_c(\ )$ are the distances corresponding to turning function and convexity/concavity degree respectively, and α is a designated coefficient, usually between 0 to 1.

The normalized lengths of the two sides in the contour primitive are stored in the polygonal approximation unit, whereby the values of $s_{i,j}$ and $s_{k,l}$ are readily obtained.

The following method is provided in the present invention to theoretically estimate the value of the parameter k in the insertion and deletion operations.

Firstly, the cost functions of the insertion and deletion operations are extended to be similar to the substitution operation, as follows:

$$c(\lambda \to a_{i,j}) = (k_t + \alpha * k_c) * k_l * s_{i,j}$$

$$c(b_{k,l} \to \lambda) = (k_t + \alpha * k_c) * k_l * s_{k,l}$$

where $k_t$, $k_c$ and $k_l$ respectively correspond to $\text{Dist}_t(\ )$, $\text{Dist}_c(\ )$ and the length ratio of the primitives (combination of primitives) in the substitution operation. Next, the values of the three parameters are statistically estimated.

The value of $k_t$ is represented as a function that takes the number of the contour primitives as an independent variable. Given number N (for $a_{i,j}$, N equals j−i+1, and for $b_{k,l}$, N equals l−k+1) of the primitives, two turning functions of N+1 segmented constant are randomly generated according to uniform distribution, and its distance is calculated. This process is repeated (for 10,000 times in an embodiment of the present invention) to get the mean value and standard deviation of these distances, denoted as $M_t(N)$, $S_t(N)$. By approximating second order item, the following relations are obtained:

$$N = 1.029 * M_t(N)^2 - 0.265 * M_t(N) + 1.271$$

$$N = 5.587 * S_t(N)^2 + 3.325 * S_t(N) - 2.963$$

The value of $k_t$ is finally set to be: $k_t = M_t(N) + S_t(N)$

Assume that convexity/concavity degree is uniformly distributed in [−1,1], the mean value and standard deviation of $\text{Dist}_c(\ )$ can be directly calculated, i.e., 2/3 and $\sqrt{2}/3$, and the value of $k_c$ is set to be the sum of these two values, i.e., $$k_c = 2/3 + \sqrt{2}/3$$

The value of $k_l$ is calculated in real time; that is to say, the value of this parameter will be different with regard to different shape objects to be matched. Given two shape objects A and B to be matched, length ratios $$\max\left(\frac{a_i}{b_j}, \frac{b_j}{a_i}\right),$$

of all contour primitives between the two shape contours A and B are calculated, and $k_l$ is set to be the sum of the mean value and standard deviation of these ratios.

According to the present invention, the comparison unit is characterized in (1) cyclic string matching; (2) merging operation; and (3) calculation of attribute values in real time for merged primitives instead of merge cost values based on experience to respond to the merging operation.

Moreover, in the comparison operation, maximally allowed number of merged primitives in the merging operation is controlled by means of a parameter LimitM.

Given two shape contours to be matched $A=a_1, \ldots, a_n$ and $B=b_1, \ldots, b_m$, the implementation process of the comparison unit is presented as follows:

(1). Calculate the value of parameter $k_l$.

```
D( 0, 0 ) = 0;
for i = 1 to m
    D( i, 0 ) = D( i−1, 0 ) + c(λ → a_i)
End
for j = 1 to n
    D( 0, j ) = 0
end
for j = n+1 to 2n
    D( 0, j ) = D( 0, j−1 ) + c(b_j → λ)
end
for i = 1 to m
    for j = 1 to 2n
        m_1 = min{ D( i, j−1 ) + c(b_{j−l+1,j} → λ) , l = 1,···,min( LimitM,j
            ) }
        m_2 = min{ D( i-k, j ) + c(λ → a_{i−k+1,i}) , k = 1,···,min( LimitM,i
            ) }
        m_3 = min{ D( i-k, j−1 ) + c(a_{i−k+1,i} → b_{j−l+1,j}) ,
                k = 1,···,min( LimitM, i ), l = 1,···,min( LimitM,j
            ) }
        D( i, j ) = min{ m_1, m_2, m_3 }
    end
end
```

(2). Calculate the value of each cell in the DP table.

The task of this procedure is to complete the value of each cell in the DP table having the size of (m+1)×(2n+1).

Initialization is firstly performed to calculate the values in the first row and first column in the DP table.

Next, the value of each cell is calculated row-by-row in the order from left to right. In order to calculate the value of the cell D(i,j), the values of the following cells and the edit distance of these cells to D(i,j) should be considered:

D(i−k, j−l), k=0, . . . ,min(LimitM, i), l=0, . . . ,min(LimitM, j), and k,j should not be 0 simultaneously.

In the current status, the values of these cells have been calculated, and it is hence necessary to calculate only the edit distance of these cells to D(i,j). Finally, the cell, the sum of whose value and the corresponding edit distance is the minimum, is selected from these cells as the initial cell of D(i,j), and this sum value is taken as the value of D(i,j).

(3). Select the distance value of the two shape contours from the DP table, namely the minimum value between the cell D(m,j), j=n+1, . . . , 2n.

Implementation Example

The execution process of the present invention is described below with the help of an implementation example.

Figure 7A:
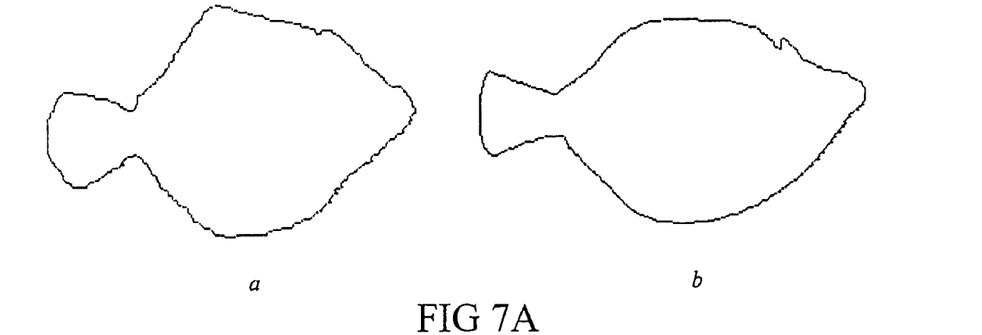
FIG. 7A shows two shape contours to be compared in the embodiment of this invention.

FIG. 7A shows two inputted shape image objects to be matched. The contour lengths of these two shape objects are respectively 481 and 692. In the following description, the left shape object in FIG. 7A is denoted as a, and the right shape object is denoted as b. In this Example, the contour pixels of the two shape objects are both arranged in counterclockwise direction.

Figure 7B:
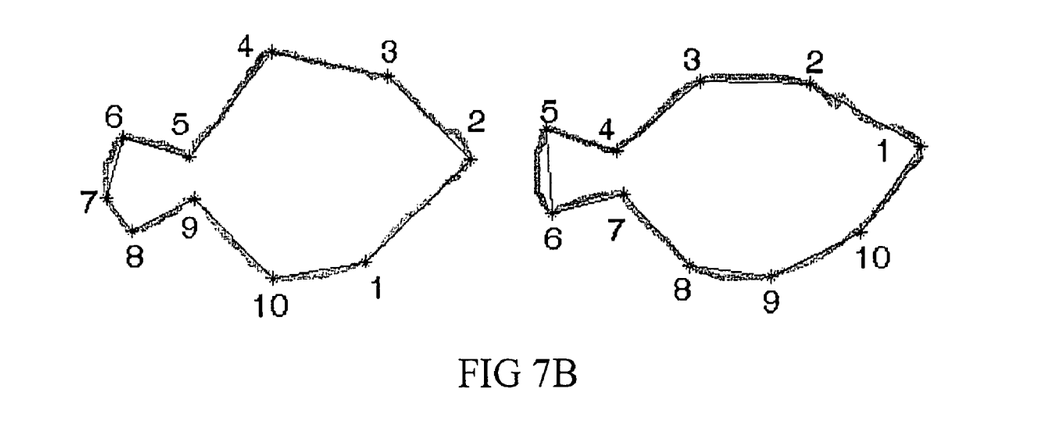
FIG. 7B shows the polygonal approximation results of two contours in the embodiment according to this invention.

FIG. 7B shows the contour approximation results of the two shape objects in FIG. 7A. In this Example, the parameter ϵ of the split-and-merge operation is set "to be contour length multiplied by a coefficient 0.02", as such, the values of ϵ corresponding to the two shape objects are respectively 9.62 and 13.84.

Vertices obtained after polygonal approximation are ordered in the same direction as that of the contours, so these vertices are ordered in counterclockwise direction in the Example. For the shape object a, 10 vertices are obtained after polygonal approximation. In FIG. 7B these vertices are respectively denoted by numerals 1 through 10. The coordinates of these vertices are as follows:

|  | Coordinate x | Coordinate y |
| --- | --- | --- |
| Vertex 1 | 126 | 10 |
| Vertex 2 | 176 | 58 |
| Vertex 3 | 137 | 98 |
| Vertex 4 | 81 | 110 |
| Vertex 5 | 42 | 61 |
| Vertex 6 | 10 | 70 |
| Vertex 7 | 2 | 42 |
| Vertex 8 | 14 | 26 |
| Vertex 9 | 44 | 41 |
| Vertex 10 | 81 | 3 |

Each vertex of the polygon is defined together with the attached two sides as a contour primitive. According to the coordinate values of these vertices of the polygon, relevant information of each primitive can be calculated, including direction of former and later sides, and normalized lengths of these sides. The specific calculation process is described below taking the shape object a as an example:

(1) For vertex 1, its adjacent former and later vertices are respectively vertex 10 and vertex 2. Therefore, former side direction of the primitive is that from vertex 10 to vertex 1 while later side direction is that from vertex 1 to vertex 2, and the specific values are respectively 0.15 and 0.77; normalized lengths of former (later) side are calculated as the half distance between vertex 10 (vertex 2) and vertex 1, and the specific value is 22.8 (34.7).

(2) For vertex 2, its adjacent former and later vertices are respectively vertex 1 and vertex 3. Therefore, former side direction of the primitive is that from vertex 1 to vertex 2 while later side direction is that from vertex 2 to vertex 3, and the specific values are respectively 0.77 and 2.34; normalized lengths of former (later) side are calculated as the half distance between vertex 1 (vertex 3) and vertex 2, and the specific value is 34.7 (27.9).

Similarly, the relevant information of all 10 contour primitives can be calculated.

Finally, the lengths of the sides in the contour primitives are normalized by circumference the polygon. And the relevant information of each contour primitive as finally obtained are shown as follows:

|  | Former Side Direction | Later Side Direction | Former Side Length | Later Side Length |
| --- | --- | --- | --- | --- |
| Vertex1 | 0.15 | 0.77 | 0.049 | 0.075 |
| Vertex2 | 0.77 | 2.34 | 0.075 | 0.061 |
| Vertex3 | 2.34 | 2.93 | 0.061 | 0.062 |
| Vertex4 | 2.93 | 4.04 | 0.062 | 0.068 |
| Vertex5 | 4.04 | 2.87 | 0.068 | 0.036 |
| Vertex6 | 2.87 | 4.43 | 0.036 | 0.032 |
| Vertex7 | 4.43 | 5.36 | 0.032 | 0.022 |
| Vertex8 | 5.36 | 0.46 | 0.022 | 0.037 |
| Vertex9 | 0.46 | 5.48 | 0.037 | 0.058 |
| Vertex10 | 5.48 | 0.15 | 0.058 | 0.049 |

In this Example, the maximally allowed number of merged contour primitives is set to be 3; in other words, maximal three adjacent contour primitives are allowed to be merged in matching. Thus, the convexity/concavity degree of all possibly merged primitives is pre-calculated by means of the first convexity/concavity degree calculation method in this Example. In matching, these convexity/concavity degrees can be readily obtained by looking up the table.

In this Example, a convexity/concavity degree table is built for each shape object. The row number of this table equals the number of the contour primitives, and the column number equals the maximum number of the contour primitives allowed to merge, namely, 3. Each row of this table corresponds to a contour primitive, and the 3 columns respectively correspond to the convexity/concavity degree of the primitive, the convexity/concavity degree of the combination of this primitive and the adjacent later primitive, and the convexity/concavity degree of the combination of this primitive and the adjacent later two primitives.

The calculation process of the convexity/concavity degree is described below taking primitive 4 of the shape object a as an example:

(1) The first column corresponds to the convexity/concavity degree of the primitive 4 itself. A single primitive is either a pure convex polyline or a pure concave polyline, therefore, its convexity/concavity degree is either 1 or −1. It is clear that, as a convex curve, the convexity/concavity degree of the primitive 4 is 1.

Figure 7C:
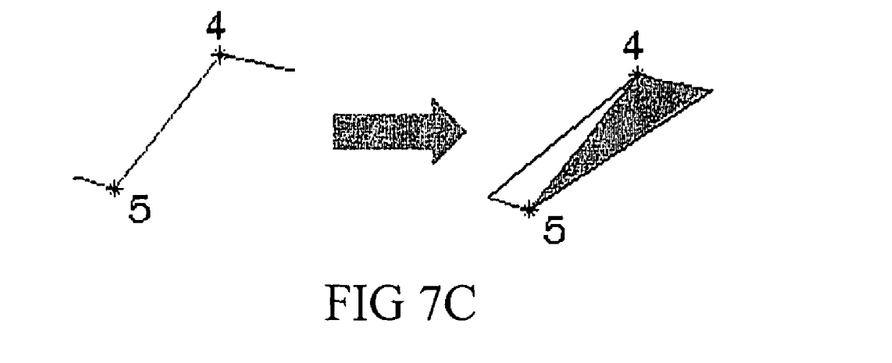
FIG. 7C shows an example of convexity/concavity degree attribute calculation involved in the embodiment according to this invention.

(2) The second column corresponds to the convexity/concavity degree of the combination of the primitives 4 and 5, and the calculation process is as follows:

Convex hull calculation of the polyline. The following 4 points are used as input to convex hull calculation: vertex 4, vertex 5, middle point of vertex 3 and vertex 4, middle point of vertex 5 and vertex 6. The coordinates of these 4 points are respectively: (81, 110), (42, 61), (109, 104), (26, 66).

Scan the inner area surrounded by this convex hull to count the areas inside and outside the closed contour. The pixel numbers inside and outside the closed contour are 781 and 409 respectively, therefore, the convexity/concavity degree is:

(781−409)/(781+409)=0.3126

FIG. 7C shows the polyline corresponding to the combination of primitives 4 and 5, as well as the convex hull.

Figure 7D:
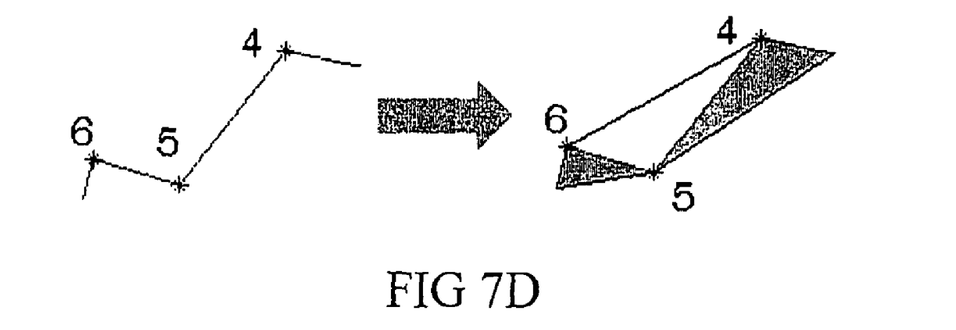
FIG. 7D shows another example of convexity/concavity degree attribute calculation involved in the embodiment according to this invention.

(3) The third column corresponds to the convexity/concavity degree of the combination of primitives 4, 5 and 6. The calculation process is as follows:

Convex hull calculation of the polyline. The following 5 points are used as input to convex hull calculation: vertex 4, vertex 5, vertex 6, middle point of vertex 3 and vertex 4, middle point of vertex 6 and vertex 7. The coordinates of these 5 points are respectively: (81, 110), (42, 61), (10, 70), (109, 104), (6, 56).

Scan the inner area surrounded by this convex hull to count the areas inside and outside the closed contour. The pixel numbers inside and outside the closed contour are 1013 and 885 respectively, therefore, the convexity/concavity degree is:

(1013−885)/(1013+885)=0.0674

FIG. 7D shows the polyline corresponding to the three primitives and the convex hull.

Similar process is used to calculate the possible convexity/concavity degree for each primitive, and the final results are shown as follows:

|  | Convexity/concavity Degree | | |
| --- | --- | --- | --- |
|  | Current Primitive | Combination with Later Primitive | Combination with Later Two Primitives |
| Primitive 1 | 1.0000 | 1.0000 | 1.0000 |
| Primitive 2 | 1.0000 | 1.0000 | 1.0000 |
| Primitive 3 | 1.0000 | 1.0000 | 0.7482 |
| Primitive 4 | 1.0000 | 0.3126 | 0.0674 |
| Primitive 5 | −1.0000 | −0.2862 | 0.2386 |
| Primitive 6 | 1.0000 | 1.0000 | 1.0000 |
| Primitive 7 | 1.0000 | 1.0000 | 0.2254 |
| Primitive 8 | 1.0000 | −0.4318 | −0.1353 |
| Primitive 9 | −1.0000 | 0.0817 | 0.7135 |
| Primitive 10 | 1.0000 | 1.0000 | 1.0000 |

Thereafter, the similarity of these two shape objects will be calculated by the comparison unit. This unit builds the correspondence of the primitives by DP technique. The core task of this process is to calculate and complete the value of each cell in the DP table. Each cell in this table corresponds to the distance between the current sub-strings, for instance, $D(i,j)$ represents the best matching distance between former i primitives of a first shape contour and former j primitives of a second shape contour. As noted above, in order to determine the value of a certain cell in the DP table, it is necessary to take into consideration the values of the previous cells and the edit distance from these cells to the current cell, and to take the minimum value as the final value of the cell. As the merging operation is adopted, it should take into consideration not only the three adjacent previous cells but also many more cells; for instance, the following adjacent cells should be taken into consideration in order to calculate the value of $D(i,j)$:

{$D(i-1, j-k)$, $l,k=1, \ldots ,LimitM$, where l,k should not be simultaneously 0} where LimitM denotes the maximally merged number allowed in the merging operation.

Let $a_i$ and $b_j$ represent the primitives of the shape objects a and b respectively, all of whose number being 10. According to the rule of cyclic matching, the primitives of the contour b are doubled in matching. Thus, this Example should complete a DP table of the size 11×21.

Next, an example is used to illustrate as how to calculate the value of each cell in the DP table. Assume the current cell be $D(i=6,j=9)$. As noted above, in order to determine the value of this cell, the values of the 15 adjacent cells from $D(i=3,j=6)$ to $D(i=6,j=9)$ as well as the edit distance from these cells to $D(i=6,j=9)$ should be considered.

The specific positions of these adjacent cells are as follows:
D(3, 6) D(3, 7) D(3, 8) D(3, 9)
D(4, 6) D(4, 7) D(4, 8) D(4, 9)
D(5, 6) D(5, 7) D(5, 8) D(5, 9)
D(6, 6) D(6, 7) D(6, 8)

The current values of these cells are as follows:

| $D(i,j)$ | $j = 6$ ($b_6$) | $j = 7$ ($b_7$) | $j = 8$ ($b_8$) | $j = 9$ ($b_9$) |
| --- | --- | --- | --- | --- |
| $i = 3$ ($a_3$) | 0.69 | 0.8 | 0.72 | 0.6 |
| $i = 4$ ($a_4$) | 0.7 | 1.05 | 0.86 | 0.77 |
| $i = 5$ ($a_5$) | 1.09 | 0.79 | 1.12 | 0.95 |
| $i = 6$ ($a_6$) | 1.02 | 1 | 0.89 | |

Next, the edit distance from these adjacent cells to the current cell $D(i=6,j=9)$ should be calculated according to the cost function. For instance, the edit distance from $D(4, 9)$ to the current cell is $c(\lambda \rightarrow a_{5,6})$, that is to say, by inserting a null primitive in the shape object b to match primitives $a_5$ and $a_6$ in the shape object a; the edit distance from $D(5, 7)$ to the current cell is $c(a_6 \rightarrow b_{8,9})$, that is to say, the distance generated in matching the primitive $a_6$ in the shape object a with the primitives $b_8$ and $b_9$ in the shape object b.

Upon calculation, the values of the distances from these adjacent cells to the current cell are as follows:

| | | | |
| --- | --- | --- | --- |
| 0.49 | 0.63 | 0.91 | 1.29 |
| 0.84 | 0.57 | 0.51 | 0.69 |
| 1.12 | 0.36 | 0.13 | 0.30 |
| 1.33 | 0.82 | 0.4 | |

The following results are obtained by summating the current values of these adjacent cells and the aforementioned value of the edit distance:

| | | | |
| --- | --- | --- | --- |
| 1.18 | 1.43 | 1.63 | 1.89 |
| 1.54 | 1.62 | 1.37 | 1.46 |
| 2.21 | 1.15 | 1.25 | 1.25 |
| 2.35 | 1.82 | 1.29 | |

The minimum value 1.15 in the above results is the value of the current cell D(6, 9). At the same time, the cell that corresponds to this minimum value, namely D(5, 7), is accepted as the origin of the cell D(6, 9).

Figure 7E:
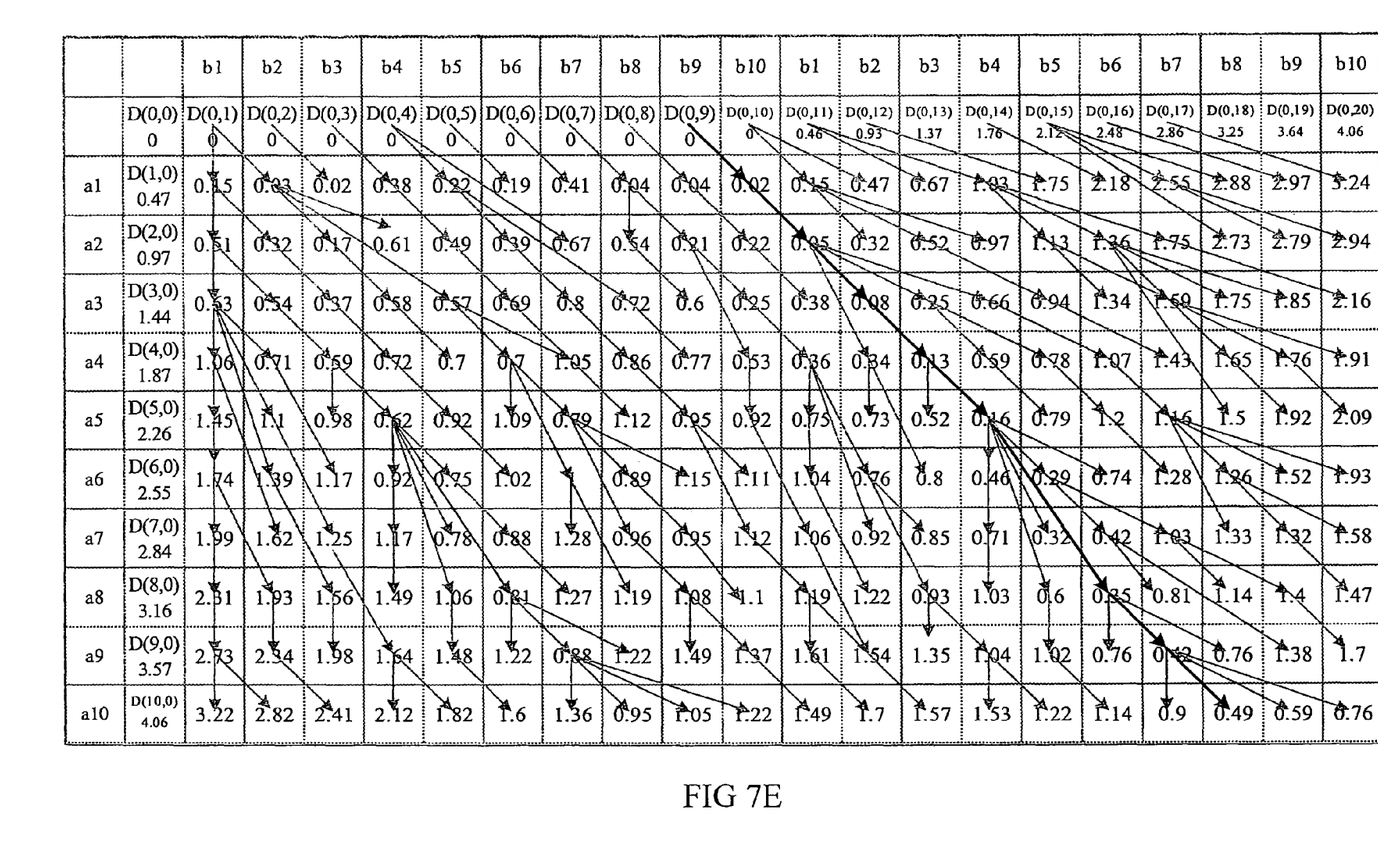
FIG. 7E shows the content of the DP table of the embodiment according to this invention.

The above process is repeated to calculate the values of all cells in the DP table, as shown in FIG. 7E, in which arrows are used to indicate the origins of each of the cells. The distance between two inputted shape objects is obtained by calculating the minimum value from the cell D(10, 11) to the cell D(10, 20), namely the value 0.48 that corresponds to D(10, 18). With D(10, 18) as the start point to sequentially trace the origin of each cell, a path is obtained that indicates the correspondence between the contour primitives. For instance, the origin D(9, 17) of D(10, 18) is firstly obtained, which means that the primitives $a_{10}$ and $b_8$ are matched; then, the origin D(8, 16) of D(9, 17) is obtained, which means that the primitives $a_9$ and $b_7$ are matched; similarly, the origin D(5, 14) of D(8, 16) is obtained, which means that the primitives $a_8$, $a_7$, $a_6$ are combined to match the combination of the primitives $b_6$, $b_5$. This process is repeated till the first row of the DP table is reached. In FIG. 7E, the path obtained in this Example is indicated by black real lines. Thus, the correspondence of the primitives is shown as follows:

a10-b8
a9-b7
a6, a7, a8-b5, b6
a5-b4
a4-b3
a3-b2
a1, a2-b1, b10

On the basis of the above explanations, according to another aspect of the present invention there is provided a shape comparison method, which comprises a polygonal approximation step for approximating an image object contour as a polygon, namely representing the image object contour into an ordered contour primitive sequence; an attribute generation step for calculating attribute value for contour primitive and contour primitive composition; and a comparison step for establishing correspondence of polygons and hence calculating similarity between contours.

In the case the input is an image object rather than an image object contour, the method further comprises an image object contour extraction step for extracting an image object contour of an image object inputted into the apparatus.

Preferably, the polygonal approximation step approximates an image object contour as a polygon using a split-and-merge method; the attribute value is one of a turning function and a convexity/concavity degree or both of the two; and the comparison step compares similarity of the image object contour using a string matching technique.

It should be recognized by a person skilled in the art that in each embodiment each of the operations can be performed by a specific circuit or connection (for example, discrete logic gates interconnected to perform special functions), by a program instruction executed by one or more processors, or by the combination of the two. Therefore, each of the aspects can be carried out by various modes of execution, and all these modes of execution should be considered to rest within the scope of the contents as described herein. For each one of these aspects, any embodiment in such mode can indicate here "a logic configured to perform said operation", or alternatively, indicate "a logic that performs or is capable of performing said operation".

Moreover, according to the embodiments of the present invention, the objects of this invention can also be realized by a computer program that enables a computer or an SCM to perform the aforementioned operations.

Furthermore, according to the embodiments of the present invention, the objects of this invention can also be realized by means of a computer-readable medium that stores the aforementioned program. The computer-readable medium can be any device capable of containing, storing, communicating, transmitting or delivering a program so as to be used by an instruction executing system, a device or an apparatus, or capable of combining with an instruction executing system, device or apparatus. For instance, the computer-readable medium can be, but is not limited to, an electronic, magnetic, optical, electromagnetic, infrared or semiconductor system, device, apparatus or dissemination medium. More specific examples of the computer-readable medium may include (not by way of exhaustive enumeration): electrical connection having one or more lead wire(s), portable computer disc, random access memory (RAM), read-only memory (ROM), erasable programmable read-only memory (EPROM), optical fiber, and compact disc read-only memory (CDROM).

The above explanations to the embodiments of the present invention are for exemplary and explanatory purposes only. The foregoing explanations are not meant to exhaust or limit this invention in the precise modes as disclosed herein. It is obvious to a person skilled in the art that many modifications and variations are obvious. The embodiments are selected and described herein to best explain the principles of the invention and its practical applications to make other persons skilled in the art understand the various embodiments and variations of the present invention, so as to adapt to specific and anticipated application. It should be understood that the scope of this invention is defined by the claims and their analogues.

The invention claimed is:

1. A shape comparison apparatus, comprising:
   a polygonal approximation unit for approximating an image object contour as a polygon, namely representing said image object contour into an ordered contour primitive sequence;
   an attribute generation unit for calculating attribute value for contour primitive and contour primitive composition, characterized in that said attribute value is a convexity/concavity degree; and
   a comparison unit for establishing correspondence of polygons and hence calculating similarity between contours.

2. The shape comparison apparatus as claimed in claim 1, characterized in further comprising an image object contour extraction unit for extracting an image object contour of an image object inputted into said apparatus.

3. The shape comparison apparatus as claimed in claim 1, characterized in that said polygonal approximation unit approximates an image object contour as a polygon using a split-and-merge method.

4. The shape comparison apparatus as claimed in claim 3, characterized in that said polygonal approximation unit uses points having higher curvature value on said image object contour as initial points of said split-and-merge method.

5. The shape comparison apparatus as claimed in claim 4, characterized in that said points having higher curvature value are points of a designated number whose curvature values rank high or points all of whose curvature values are larger than a certain threshold value.

6. The shape comparison apparatus as claimed in claim 1, characterized in that said attribute value further includes a turning function.

7. The shape comparison apparatus as claimed in claim 1, characterized in that said convexity/concavity degree is calculated as follows:
   let $a_{i,j}$ represent merged primitives composed by contour primitives from $a_i$ to $a_j$, the convexity/concavity degree c $(a_{i,j})$ of $a_{i,j}$ is as follows:

$$c(a_{i,j}) = (InA - OutA)/(InA + OutA)$$

where, InA and OutA are respectively the areas inside and outside a closed contour in a convex hull of the points collection from $a_i, \ldots, a_j$.

8. The shape comparison apparatus as claimed in claim 1, characterized in that said convexity/concavity degree is calculated as follows: let $a_{i,j}$ represent merged primitives composed by contour primitives from $a_i$ to $a_j$, and Area($a_i$) denote an area of triangle corresponding to the contour primitive $a_i$, the convexity/concavity degree c ($a_{i,j}$) of $a_{i,j}$ is defined as:

$$c(a_{i,j}) = \sum_{t=i}^{j} \text{Area}(a_t) \bigg/ \bigg|\sum_{t=i}^{j} \text{Area}(a_t)\bigg|.$$

9. The shape comparison apparatus as claimed in claim 1, characterized in that the contour primitive composition is a composition of a group of adjacent contour primitives, and that the number of the composition is at most the number of the contour primitives allowed to be merged with it.

10. The shape comparison apparatus as claimed in claim 1, characterized in that said comparison unit compares similarity of the image object contour using a string matching technique.

11. The shape comparison apparatus as claimed in claim 10, characterized in that said comparison unit uses a cyclic matching strategy, namely calculates, when comparing A and B, the distance between string A and string $B^2$ by using a standard string matching technique, where $B^2$ represents a string obtained by doubling cycle B.

12. The shape comparison apparatus as claimed in claim 10 or 11, characterized in that said comparison unit uses a merge operation, namely, it considers the following adjacent cells in order to calculate the value of D(ij):
{D(i−l, j−k), l,k=0, . . . ,LimitM, where l,k cannot be both zero simultaneously}
where D(i,j) represents the optimal matching distance between the previous i number of primitives in a first shape contour and the previous j number of primitives in a second shape contour, and LimitM is the maximal number of merge allowed in the merge operation.

13. The shape comparison apparatus as claimed in claim 12, characterized in that the value of D(i,j) is calculated by the following formula:

$$D(i,j) = \text{Dist}_t(i,j) + \alpha \times \text{Dist}_c(i,j)$$

where $\text{Dist}_t(\ )$ and $\text{Dist}_c(\ )$ respectively represent the values of distance corresponding to the turning function and the convexity/concavity degree, and α is a designated coefficient, between 0 and 1.

14. The shape comparison apparatus as claimed in claim 1, characterized in that said attribute generation unit calculates the attribute values in advance, and that said comparison unit obtains these attribute values through a search list upon comparison.

15. The shape comparison apparatus as claimed in claim 1, characterized in that said comparison unit obtains said attribute values in real time through said attribute generation unit upon comparison.

16. A shape comparison method, comprising:
a polygonal approximation step for approximating an image object contour as a polygon, namely representing said image object contour into an ordered contour primitive sequence;
an attribute generation step for calculating attribute value for contour primitive and contour primitive composition characterized in that said attribute value is a convexity/concavity degree; and
a comparison step for establishing correspondence of polygons and hence calculating similarity between contours,
wherein the polygonal approximation step, the attribute generation step, and the comparison step are each performed by a computer.

17. The shape comparison method as claimed in claim 16, further comprising an image object contour extraction step for extracting an image object contour of an image object inputted into said apparatus.

18. The shape comparison method as claimed in claim 16, characterized in that said polygonal approximation step approximates an image object contour as a polygon using a split-and-merge method.

19. The shape comparison method as claimed in claim 18, characterized in that said polygonal approximation step uses points having higher curvature value on said image object contour as initial points of said split-and-merge method.

20. The shape comparison method as claimed in claim 19, characterized in that said points having higher curvature value are points of a designated number whose curvature values rank high or points all of whose curvature values are greater than a certain threshold value.

21. The shape comparison method as claimed in claim 16, characterized in that said attribute value further includes a turning function.

22. The shape comparison method as claimed in claim 16, characterized in that said convexity/concavity degree is calculated as follows:
let $a_{i,j}$ represent merged primitives composed by contour primitives from $a_i$ to $a_j$, the convexity/concavity degree c ($a_{i,j}$) of $a_{i,j}$ is as follows:

$$c(a_{i,j}) = (\text{In}A - \text{Out}A)/(\text{In}A + \text{Out}A)$$

where, InA and OutA are respectively the areas inside and outside a closed contour in a convex hull of the points collection from $a_i, \ldots, a_j$.

23. The shape comparison method as claimed in claim 16, characterized in that said convexity/concavity degree is calculated as follows: let $a_{i,j}$ represent merged primitives composed by contour primitives from $a_i$ to $a_j$, and Area($a_i$) denote an area of triangle corresponding to the contour primitive $a_i$, the convexity/concavity degree c ($a_{i,j}$) of $a_{i,j}$ is defined as:

$$c(a_{i,j}) = \sum_{t=i}^{j} \text{Area}(a_t) \bigg/ \bigg|\sum_{t=i}^{j} \text{Area}(a_t)\bigg|.$$

24. The shape comparison method as claimed in claim 16, characterized in that the contour primitive composition is a composition of a group of adjacent contour primitives, and that the number of the composition is at most the number of the contour primitives allowed to be merged with it.

25. The shape comparison method as claimed in claim 16, characterized in that said comparison step compares similarity of the image object contour using a string matching technique.

26. The shape comparison method as claimed in claim 25, characterized in that said comparison step uses a cyclic matching strategy, namely calculates, when comparing A and B, the distance between string A and string $B^2$ by using a standard string matching technique, where $B^2$ represents a string obtained by doubling cycle B.

27. The shape comparison method as claimed in claim 25 or 26, characterized in that said comparison step uses a merge operation, namely, it considers the following adjacent cells in order to calculate the value of D(ij):

{D(i−l, j−k), l,k=1, . . . ,LimitM, where l,k cannot be both zero simultaneously} where D(i,j) represents the optimal matching distance between the previous i number of primitives in a first shape contour and the previous j number of primitives in a second shape contour, and LimitM is the maximal number of merge allowed in the merge operation.

28. The shape comparison method as claimed in claim 27, characterized in that the value of D(i,j) is calculated by the following formula:

$$D(i,j) = Dist_t(i,j) + \alpha \times Dist_c(i,j)$$

where $Dist_t()$ and $Dist_c()$ respectively represent the values of distance corresponding to the turning function and the convexity/concavity degree, and $\alpha$ is a designated coefficient, between 0 and 1.

29. The shape comparison method as claimed in claim 16, characterized in that said attribute generation step calculates the attribute values in advance, and that said comparison step obtains these attribute values through a search list upon comparison.

30. The shape comparison method as claimed in claim 16, characterized in that said comparison step obtains said attribute values in real time through said attribute generation step upon comparison.

* * * * *

UNITED STATES PATENT AND TRADEMARK OFFICE
CERTIFICATE OF CORRECTION

| | | |
|---|---|---|
| PATENT NO. | : 8,031,948 B2 | |
| APPLICATION NO. | : 11/784734 | |
| DATED | : October 4, 2011 | |
| INVENTOR(S) | : Liu et al. | |

It is certified that error appears in the above-identified patent and that said Letters Patent is hereby corrected as shown below:

Claim 12
Col. 19, Line 33

Delete "D(ij):" and replace it with --D(i,j):--.

Claim 23
Col. 20, Line 47

Delete the entire formula beginning with "$c(a_{i,j}) =$" and replace it with the following formula:

$$-- c(a_{i,J}) = \sum_{i=1}^{J} Area(a_i) / \sum_{i=1}^{J} |Area(a_i)| \ --.$$

Claim 27
Col. 21, Line 2

Delete "D(ij):" and replace it with --D(i,j):--.

Signed and Sealed this
Twenty-fourth Day of April, 2012

David J. Kappos
*Director of the United States Patent and Trademark Office*